(12) United States Patent
Shih et al.

(10) Patent No.: US 10,831,036 B2
(45) Date of Patent: *Nov. 10, 2020

(54) ZOOM FUNCTION SYSTEM

(71) Applicant: Ultimems, Inc., New Taipei (TW)

(72) Inventors: Forster Shih, Taipei (TW); Yee-Chung Fu, Fremont, CA (US)

( * ) Notice: Subject to any disclaimer, the term of this patent is extended or adjusted under 35 U.S.C. 154(b) by 412 days.

This patent is subject to a terminal disclaimer.

(21) Appl. No.: 14/987,762

(22) Filed: Jan. 5, 2016

(65) Prior Publication Data
US 2016/0187615 A1 Jun. 30, 2016

Related U.S. Application Data (63) Continuation-in-part of application No. 14/970,538, filed on Dec. 15, 2015.

(60) Provisional application No. 62/100,773, filed on Jan. 7, 2015, provisional application No. 62/096,854, filed on Dec. 24, 2015.

(51) Int. Cl.
| | |
|---|---|
| *G02B 27/64* | (2006.01) |
| *G02B 7/02* | (2006.01) |
| *G02B 13/00* | (2006.01) |
| *G02B 7/105* | (2006.01) |

(52) U.S. Cl.
CPC ........... *G02B 27/646* (2013.01); *G02B 7/021* (2013.01); *G02B 7/105* (2013.01); *G02B 13/009* (2013.01)

(58) Field of Classification Search
CPC ........ G02B 7/08; G02B 7/021; G02B 27/646; B81B 3/0062; B81B 2201/047
See application file for complete search history.

(56) References Cited

U.S. PATENT DOCUMENTS

| | | | | |
|---|---|---|---|---|
| 5,025,346 A | * | 6/1991 | Tang | B81B 3/0021 361/283.1 |
| 5,760,957 A | * | 6/1998 | Suzuki | G02B 15/173 359/554 |
| 6,091,537 A | * | 7/2000 | Sun | B81B 3/0062 359/248 |
| 6,226,122 B1 | * | 5/2001 | Sugawara | G02B 13/02 359/407 |
| 2004/0198063 A1 | * | 10/2004 | Subramanian | B81C 1/00626 438/712 |
| 2008/0198249 A1 | * | 8/2008 | Tanimura | H04N 5/2253 348/294 |
| 2010/0156109 A1 | * | 6/2010 | Ivanovich | F03D 1/04 290/55 |
| 2010/0284081 A1 | * | 11/2010 | Gutierrez | G02B 7/102 359/554 |
| 2012/0307372 A1 | * | 12/2012 | Ichikawa | G02B 15/177 359/680 |

(Continued)

*Primary Examiner* — Cara E Rakowski
(74) *Attorney, Agent, or Firm* — Chen-Chi Li (57) ABSTRACT

A zoom function system is disclosed. The zoom function system includes an upper lens assembly, a lower lens assembly, an upper actuator, and a lower actuator. The upper and the lower actuators have stationary elements and movable elements. The upper lens assembly is attached to one of the movable elements of the upper actuator. The lower lens assembly is attached to one of the movable elements of the lower actuator. The zoom function system allows three degrees of freedoms of translational adjustments of lens assemblies and is capable of realigning the lens assemblies to improve the qualities of images.

17 Claims, 8 Drawing Sheets

(56) References Cited

U.S. PATENT DOCUMENTS

| | | | |
|---|---|---|---|
| 2013/0077168 A1* | 3/2013 | Gutierrez | H02N 1/006 359/554 |
| 2013/0242166 A1* | 9/2013 | Hosoi | G02B 15/173 348/345 |
| 2013/0258140 A1* | 10/2013 | Lipson | G03B 3/10 348/240.3 |
| 2013/0293764 A1* | 11/2013 | Lipson | H04N 5/2257 348/345 |
| 2015/0185976 A1* | 7/2015 | Jiang | G06F 3/04817 715/834 |
| 2016/0048011 A1* | 2/2016 | Suzuki | G02B 21/02 348/79 |

* cited by examiner

ZOOM FUNCTION SYSTEM

CROSS-REFERENCE TO RELATED APPLICATIONS

This patent application claims benefit of a provisional patent application 62/100,773 filed on Jan. 7, 2015. The disclosure made in the provisional patent application 62/100,773 is hereby incorporated by reference. This Patent Application is a Continuation in Part (CIP) Application of a application Ser. No. 14/970,538 filed on Dec. 15, 2015 by having a common inventor. The Disclosure made in the patent application Ser. No. 14/970,538 is hereby incorporated by reference.

FIELD OF THE INVENTION

This invention relates generally to a zoom function system of a camera module. More particularly, the present invention relates to a zoom function system allowing three degrees of freedoms of translational adjustments of lens assemblies.

BACKGROUND OF THE INVENTION

Zoom function is now a standard function in miniature cameras. There is a constant need to improve performance of zoom function. It is advantageous to extend the zoom function technology to include more degrees of freedoms of translational adjustments of lens assemblies.

SUMMARY OF THE INVENTION

This invention discloses a zoom function system that allows three degrees of freedoms of translational adjustments of lens assemblies. The zoom function system includes an upper lens assembly, a lower lens assembly, an upper actuator, and a lower actuator. The upper and the lower actuators have stationary elements and movable elements. The upper lens assembly is attached to one of the movable elements of the upper actuator. The lower lens assembly is attached to one of the movable elements of the lower actuator. Blurred images may be induced by misalignment of lens assemblies or off optical axis motion of lens assemblies during zooming process. The capabilities of the three degrees of freedoms of the translational adjustments of lens assemblies may re-align the lens assemblies and improve the qualities of images.

DETAILED DESCRIPTION OF THE INVENTION

Figure 1:
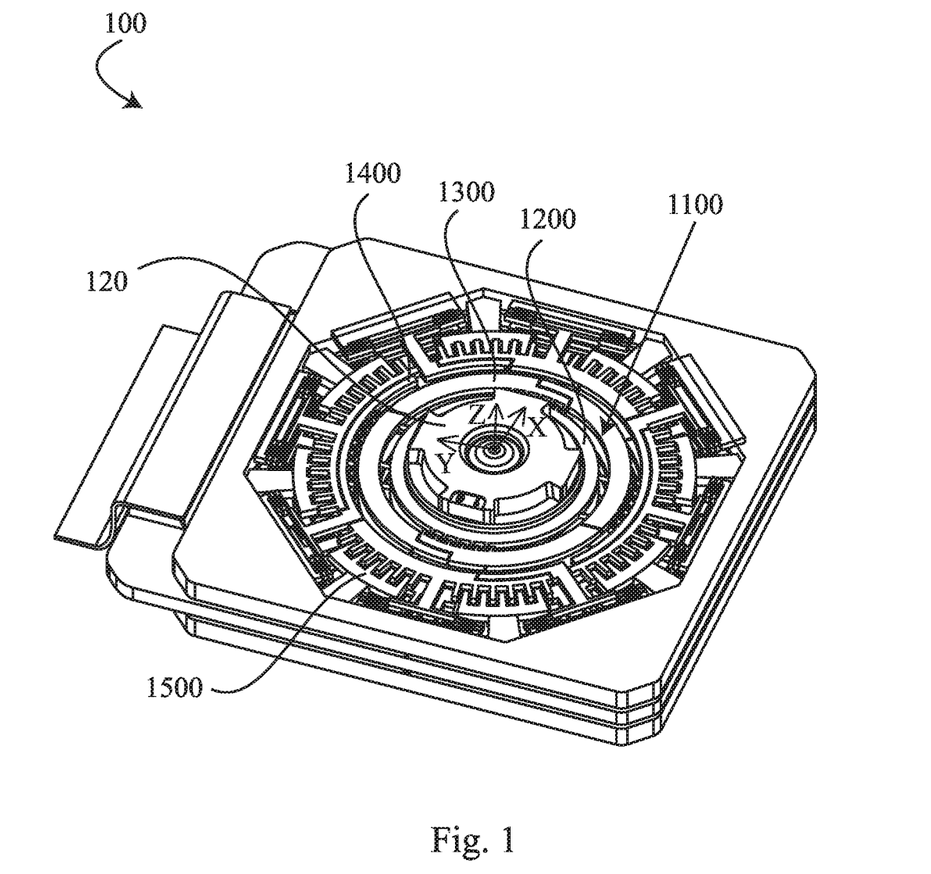
FIG. 1 is a schematic perspective view of a zoom function system in examples of the present disclosure.
Figure 2:
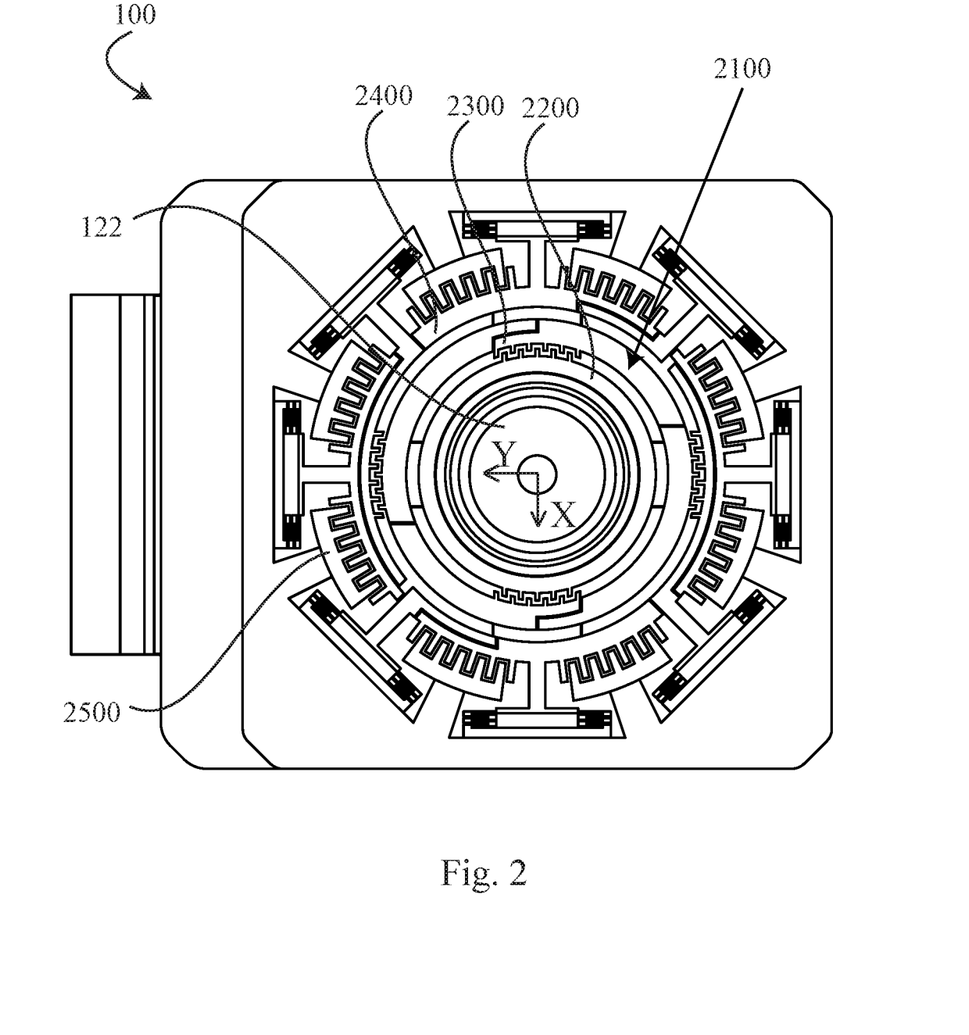
FIG. 2 is a bottom view of the zoom function system of FIG. 1.

FIG. 1 is a schematic perspective view of a zoom function system 100 in examples of the present disclosure. FIG. 2 is a bottom view of zoom function system 100 of FIG. 1. As shown in FIG. 1 and FIG. 2, zoom function system 100 includes an upper lens assembly 120, a lower lens assembly 122, an upper actuator 1100 and a lower actuator 2100. Upper actuator 1100 includes one or more upper stationary elements 1500, a first upper translation element 1200 to translate along X direction, a second upper translation element 1300 to translate along Y direction, and a third upper translation element 1400 to translate along Z direction. Lower actuator 2100 includes one or more lower stationary elements 2500, a first lower translation element 2200 to translate along X direction, a second lower translation element 2300 to translate along Y direction, and a third lower translation element 2400 to translate along Z direction. Upper lens assembly 120 is attached to first upper translation element 1200 of upper actuator 1100. Lower lens assembly 122 is attached to first lower translation element 2200 of lower actuator 2100.

In examples of the present disclosure, the translations of translation elements 1200, 1300, 1400, 2200, 2300, and 2400 may be driven by electrostatic comb drives.

In examples of the present disclosure, upper lens assembly 120 moves along positive X direction when first upper translation element 1200 translates a positive displacement along X axis. Upper lens assembly 120 and first upper translation element 1200 move along positive Y direction when second upper translation element 1300 translates a positive displacement along Y axis. Upper lens assembly 120, first upper translation element 1200, and second upper translation element 1300 move along positive Z direction when third upper translation element 1400 translates a positive displacement along Z axis.

In examples of the present disclosure, lower lens assembly 122 moves along positive X direction when first lower translation element 2200 translates a positive displacement along X axis. Lower lens assembly 122 and first lower translation element 2200 move along positive Y direction when second lower translation element 2300 translates a positive displacement along Y axis. Lower lens assembly 122, first lower translation element 2200, and second lower translation element 2300 move along positive Z direction when third lower translation element 2400 translates a positive displacement along Z axis.

In one example, upper lens assembly 120 includes a single lens and lower lens assembly 122 includes a single lens. In another example, upper lens assembly 120 includes a barrel and lower lens assembly 122 includes a barrel.

In examples of the present disclosure, zoom function system 100 may further include one or more lens assemblies. In examples of the present disclosure, zoom function system 100 may further include one or more lens assemblies and one or more actuators. Each of the one or more lens assemblies is attached to one of the one or more actuators.

Figure 3:
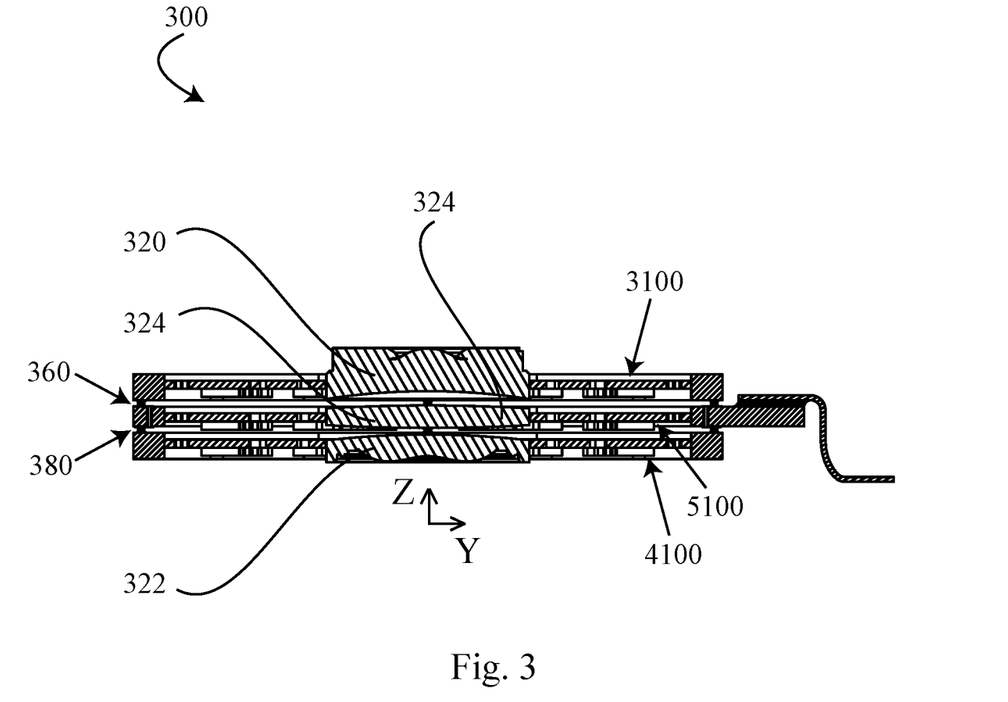
FIG. 3 is a cross-sectioned view of another zoom function system in examples of the present disclosure.
Figure 8:
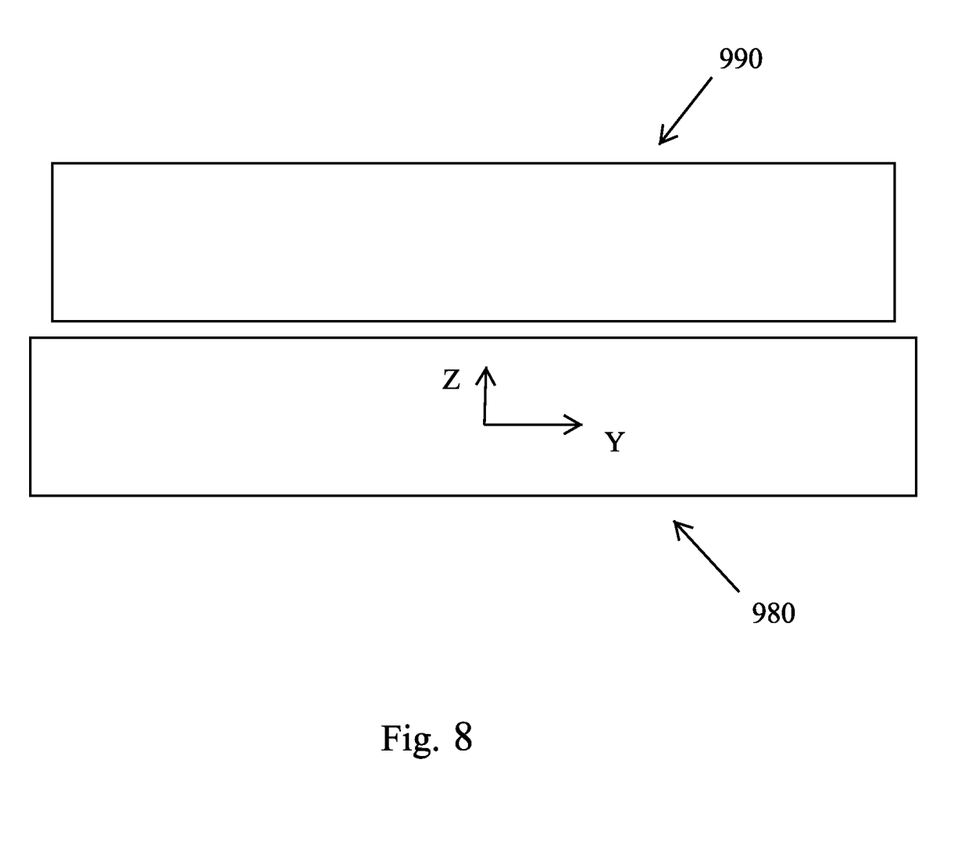
FIG. 8 shows a zoom function system integrated with an autofocus system of U.S. 62/096,854 in examples of the present disclosure.

In examples of the present disclosure, a camera module may include zoom function system 100 and an autofocus system disclosed in U.S. 62/096,854. FIG. 8 shows a zoom function system 990 integrated with an autofocus system 980 of U.S. 62/096,854 in examples of the present disclosure FIG. 3 is a cross-sectioned view of another zoom function system 300 in examples of the present disclosure. Zoom function system 300 includes an upper lens assembly 320, a lower lens assembly 322, a mid-range lens assembly 324, an upper actuator 3100, a lower actuator 4100, and a mid-range actuator 5100. A first set of solder balls 360 may connect mid-range actuator 5100 and upper actuator 3100. A second set of solder balls 380 may connect mid-range actuator 5100 and lower actuator 4100.

Figure 4:
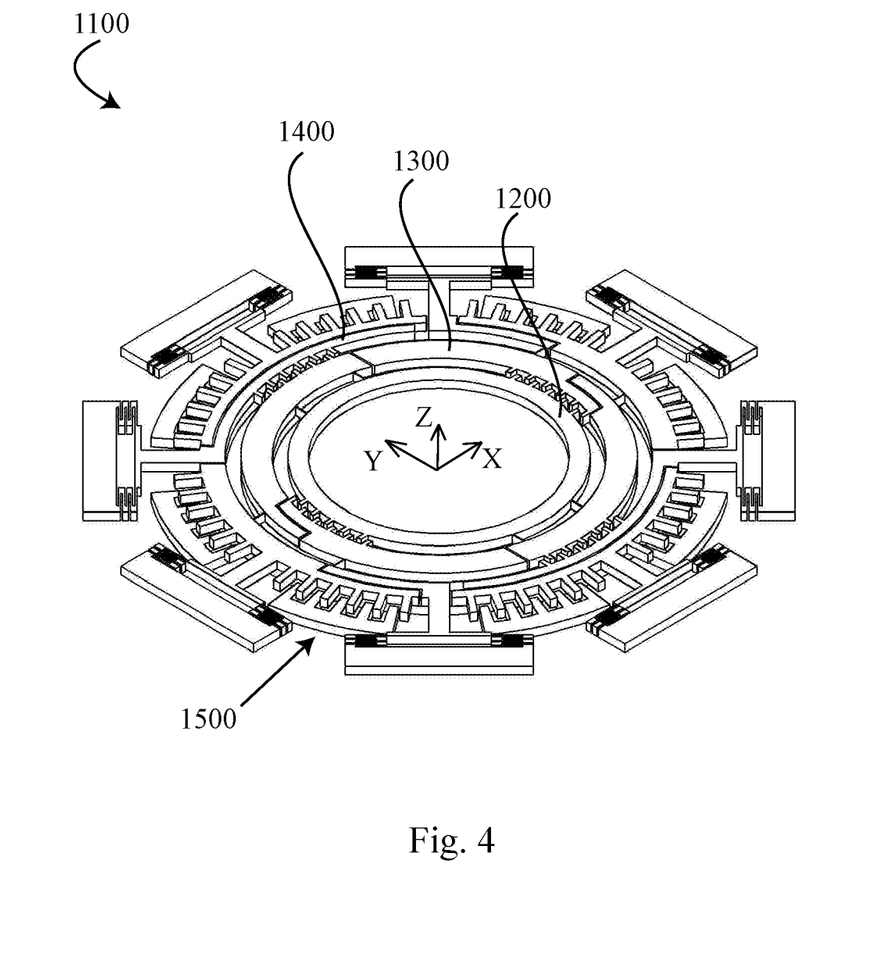
FIG. 4 is a schematic perspective view of an actuator in examples of the present disclosure.

FIG. 4 is a schematic perspective view of an actuator 1100 (upper actuator 1100 of FIG. 1) in examples of the present disclosure. Actuator 1100 includes one or more stationary elements 1500, a first translation element 1200 to translate along X direction, a second translation element 1300 to translate along Y direction, and a third translation element 1400 to translate along Z direction. In examples of the present disclosure, lower actuator 2100 is similar to upper actuator 1100.

In examples of the present disclosure, first translation element 1200, second translation element 1300, and third translation element 1400 are in cylindrical shapes and have the same central axis (Z axis). In one example, the radius of first translation element 1200 is smaller than the radius of second translation element 1300 and the radius of second translation element 1300 is smaller than the radius of third translation element 1400. In another example, the radius of first translation element 1200 is larger than the radius of second translation element 1300 and the radius of third translation element 1400 is larger than the radius of first translation element 1200.

Figure 5:
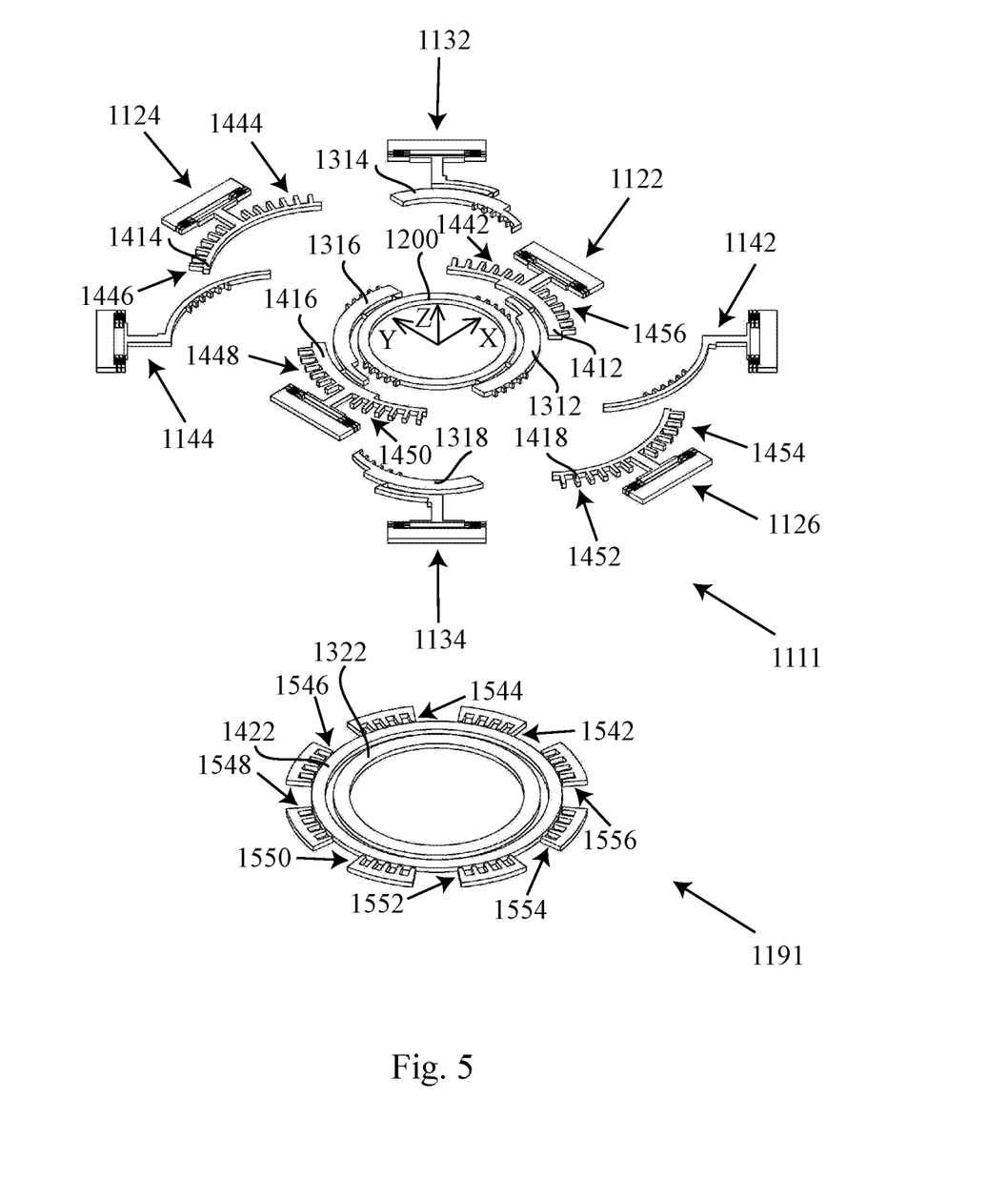
FIG. 5 is an exploded plot of the actuator of FIG. 4.
Figure 7:
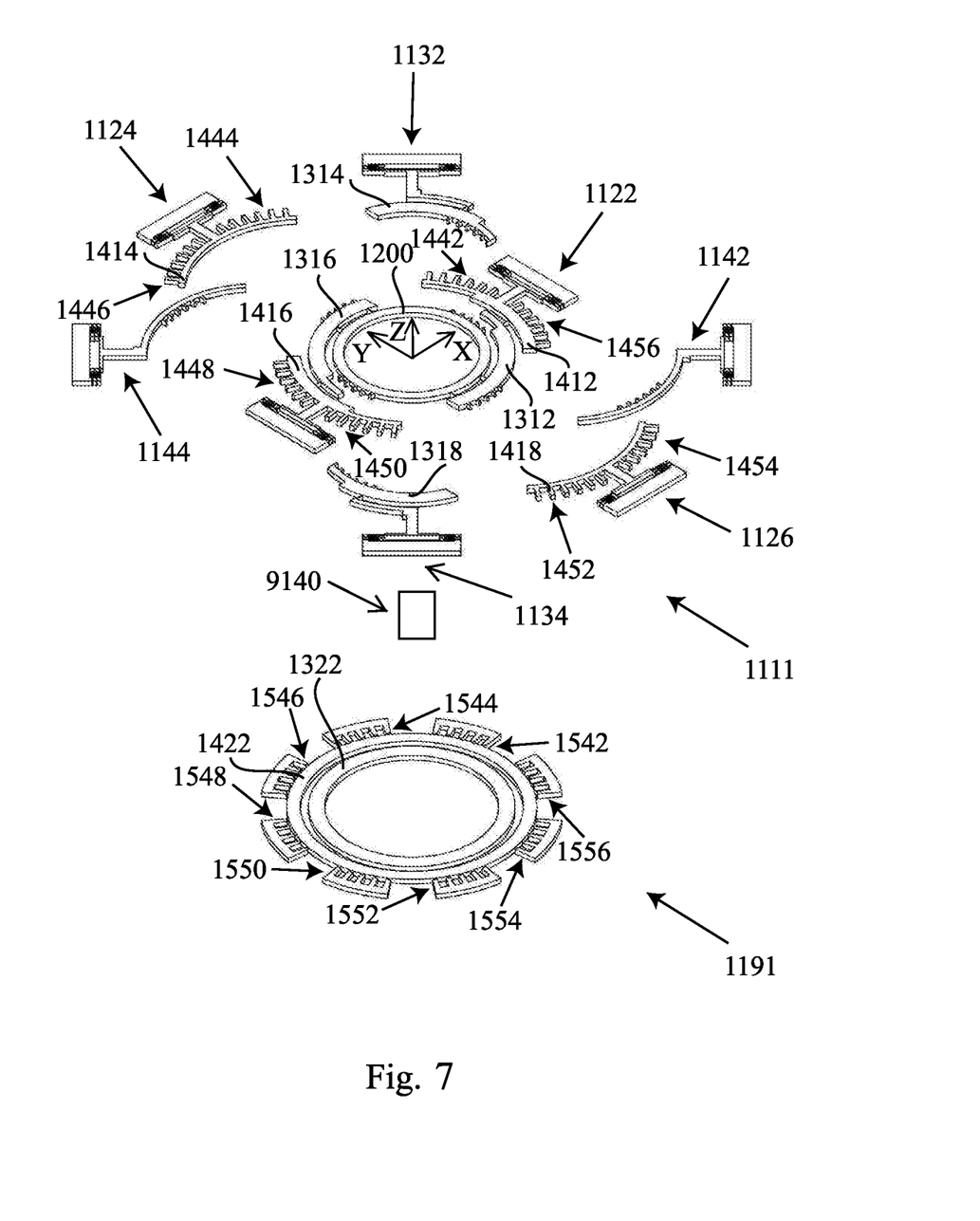
FIG. 7 is an exploded plot of an actuator of still another zoom function system in examples of the present disclosure.

FIG. 5 is an exploded plot of actuator 1100 of FIG. 4. Actuator 1100 may include a top layer 1111 and a bottom layer 1191. In one example, top layer 1111 is attached to bottom layer 1191. In another example, top layer 1111 is attached to a middle layer (for example, 9140 of FIG. 7) and the middle layer is attached to bottom layer 1191. In examples of the present disclosure, top layer 1111 and bottom layer 1191 are made of silicon and middle layer is made of silicon oxide. FIG. 7 is a variation of FIG. 5. Top layer 1111 is attached to a middle layer 9140 and the middle layer is attached to bottom layer 1191.

Top layer 1111 may include ground electrode member 1122, ground electrode member 1124, ground electrode member 1126, X-driving electrode member 1132, X-driving electrode member 1134, Y-driving electrode member 1142, and Y-driving electrode member 1144. Ground electrode members 1122, 1124, and 1126 connect to ground. X-driving electrode members 1132 and 1134 connect to driving voltage potentials. Y-driving electrode members 1142 and 1144 connect to driving voltage potentials.

Bottom layer 1191 may include Z-driving electrodes 1542, 1544, 1546, 1548, 1550, 1552, 1554, and 1556, support ring 1322, and support ring 1422.

First translation element 1200 may be in top layer 1111. Second translation element 1300 may include arc member 1312, arc member 1314, arc member 1316, and arc member 1318 in top layer 1111 and support ring 1322 in bottom layer 1911. Third translation element 1400 may include arc member 1412, arc member 1414, arc member 1416, and arc member 1418 in top layer 1111 and support ring 1422 in bottom layer 1911.

In examples of the present disclosure, moving electrodes 1442, 1444, 1446, 1448, 1450, 1452, 1454, and 1456 are engaged with Z-driving electrodes 1542, 1544, 1546, 1548, 1550, 1552, 1554, and 1556 to form eight out-of-plane comb drives.

Figure 6:
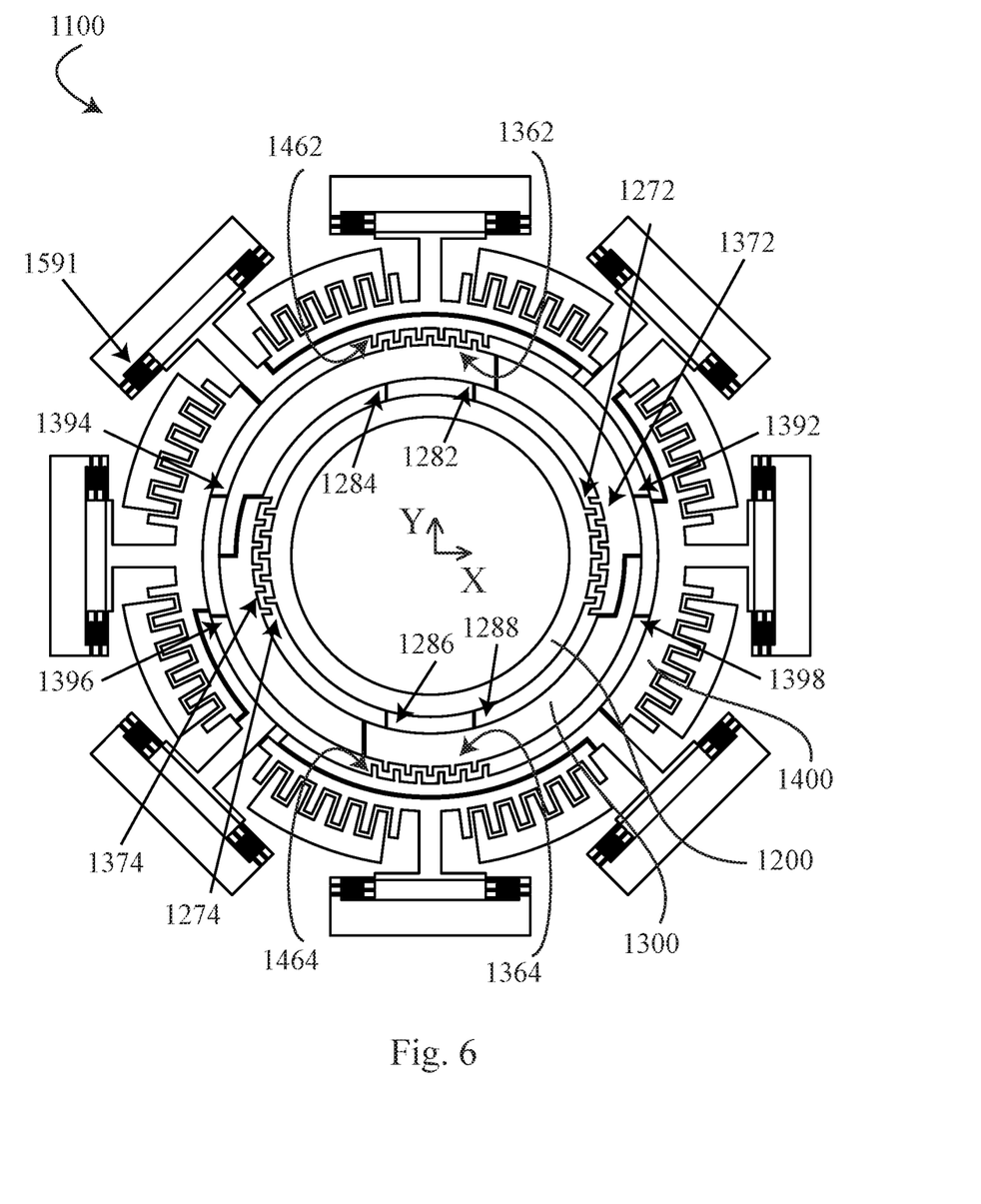
FIG. 6 is a top view of the actuator of FIG. 4.

FIG. 6 is a top view of actuator 1100 of FIG. 4. Actuator 1100 further includes X-translational springs 1282, 1284, 1286, and 1288, Y-translational springs 1392, 1394, 1396, and 1398, and one or more Z-translational springs 1591. X-translational springs 1282, 1284, 1286, and 1288 connect first translation element 1200 and second translation element 1300. Y-translational springs 1392, 1394, 1396, and 1398 connect second translation element 1300 and third translation element 1400.

Moving electrodes 1272 and 1274 extending from first translation element 1200 are engaged with X-driving electrodes 1372 and 1374 extending from second translation element 1300 to form two in-plane comb drives. Moving electrodes 1362 and 1364 extending from second translation element 1300 are engaged with Y-driving electrodes 1462 and 1464 extending from third translation element 1400 to form two in-plane comb drives.

Those of ordinary skill in the art may recognize that modifications of the embodiments disclosed herein are possible. For example, the numbers of springs may vary; the springs may be linear springs, serpentine springs, or other kinds of springs; the numbers of comb drives may vary; and the numbers and the shapes of the comb teeth of the comb drives may vary. Other modifications may occur to those of ordinary skill in this art, and all such modifications are deemed to fall within the purview of the present invention, as defined by the claims.

The invention claimed is:

1. A zoom function system, comprising:
   an upper lens assembly;
   a lower lens assembly;
   an upper actuator comprising:
     one or more upper stationary elements;
     a first upper translation element to translate along a first direction;
     a second upper translation element to translate along a second direction perpendicular to the first direction; and
     a third upper translation element to translate along a third direction perpendicular to the first and the second directions;
   a lower actuator comprising:
     one or more lower stationary elements;
     a first lower translation element to translate along the first direction;
     a second lower translation element to translate along the second direction; and
     a third lower translation element to translate along the third direction;
   one or more first upper comb drives operative to drive the first upper translation element to translate along the first direction;
   one or more second upper comb drives operative to drive the first upper translation element and the second upper translation element to translate along the second direction; and
   one or more third upper comb drives operative to drive the first upper translation element, the second upper translation element and the third upper translation element to translate along the third direction;
   wherein the upper lens assembly is attached to the first upper translation element of the upper actuator and the lower lens assembly is attached to the first lower translation element of the lower actuator.

2. The zoom function system of claim 1, wherein the translations of translation elements are driven by electrostatic comb drives.

3. The zoom function system of claim 1, wherein the upper lens assembly comprises a single upper lens and the lower lens assembly comprises a single lower lens.

4. The zoom function system of claim 1, wherein the upper lens assembly comprises an upper barrel and the lower lens assembly comprises a lower barrel.

5. The zoom function system of claim 1, further comprising
a mid-range lens assembly;
a mid-range actuator comprising:
one or more mid-range stationary elements;
a first mid-range translation element to translate along the first direction;
a second mid-range translation element to translate along the second direction; and
a third mid-range translation element to translate along the third direction;
wherein the mid-range lens assembly is attached to the first mid-range translation element of the mid-range actuator.

6. The zoom function system of claim 5, further comprising a first set of solder balls and a second set of solder balls, wherein the first set of solder balls connect the mid-range actuator and the upper actuator and the second set of solder balls connect the mid-range actuator and the lower actuator.

7. The zoom function system of claim 1, further comprising:
first upper relatively stationary electrodes extending from the second upper translation element;
second upper relatively stationary electrodes extending from the third upper translation element;
upper stationary electrodes extending from the one or more upper stationary elements;
first upper movable electrodes extending from the first upper translation element and being interdigitated with the first upper relatively stationary electrodes to form one or more first upper comb drives;
second upper movable electrodes extending from the second upper translation element and being interdigitated with the second upper relatively stationary electrodes to form one or more second upper comb drives; and
third upper movable electrodes extending from the third upper translation element and being engaged with the upper stationary electrodes to form one or more third upper comb drives.

8. The zoom function system of claim 7, wherein the one or more first upper comb drives and the one or more second upper comb drives are in-plane comb drives and the one or more third upper comb drives are out-of-plane comb drives.

9. The zoom function system of claim 1, further comprising one or more first upper springs, one or more second upper springs, and one or more third upper springs, wherein
the first upper translation element is coupled by the one or more first upper springs to the second upper translation element;
the second upper translation element is coupled by the one or more second upper springs to the third upper translation element; and
the third upper translation element is coupled by the one or more third upper springs to the one or more upper stationary elements.

10. The zoom function system of claim 1, wherein the first upper translation element is electrically connected to ground.

11. The zoom function system of claim 1, wherein the second upper translation element comprises
a top layer comprising
one or more first components electrically connected to ground;
one or more second components electrically connected to one or more driving voltage potentials;
wherein the one or more first component and the one or more second component are separated by one or more gaps;
a middle insulation layer; and
a bottom supporting layer.

12. The zoom function system of claim 1, wherein the third upper translation element comprises
a top layer comprising
one or more first components electrically connected to ground;
one or more second components electrically connected to one or more driving voltage potentials;
wherein the one or more first component and the one or more second component are separated by one or more gaps;
a middle insulation layer; and
a bottom supporting layer.

13. The zoom function system of claim 1, further integrating with an additional autofocus system comprising:
an autofocus lens assembly;
an upper autofocus actuator; and
a lower autofocus actuator;
wherein the autofocus lens assembly is attached to the upper autofocus actuator and the lower autofocus actuator.

14. The zoom function system of claim 1, wherein the second upper translation element has an annular opening to receive the first upper translation element;
wherein the third upper translation element has an annular opening to receive the second upper translation element;
wherein a radius of the first upper translation element is smaller than a radius of the second upper translation element;
wherein the radius of second upper translation element is smaller than a radius of the third upper translation element; and
wherein a radius of the annular opening of the second upper translation element is smaller than a radius of the annular opening of the third upper translation element.

15. The zoom function system of claim 1, wherein the upper lens assembly moves along the first direction when the first upper translation element translates a positive displacement along the first direction;
the upper lens assembly and the first upper translation element move along the second direction when the second upper translation element translates a positive displacement along the second direction; and
the upper lens assembly, the first upper translation element, and the second upper translation element move along the third direction when the third upper translation element translates a positive displacement along the third direction.

16. The zoom function system of claim 1, wherein the upper lens assembly is directly attached to the first upper translation element of the upper actuator and the lower lens assembly is directly attached to the first lower translation element of the lower actuator.

17. A zoom function system, comprising:
an upper lens assembly;
a lower lens assembly;
an upper actuator comprising:
one or more upper stationary elements;

a first upper translation element to translate along a first direction;
a second upper translation element to translate along a second direction perpendicular to the first direction; and
a third upper translation element to translate along a third direction perpendicular to the first and the second directions;
and
a lower actuator comprising:
one or more lower stationary elements;
a first lower translation element to translate along the first direction;
a second lower translation element to translate along the second direction; and
a third lower translation element to translate along the third direction;
wherein the upper lens assembly is attached to the first upper translation element of the upper actuator and the lower lens assembly is attached to the first lower translation element of the lower actuator;
wherein the second upper translation element has an annular opening to receive the first upper translation element; and
wherein the third upper translation element has an annular opening to receive the second upper translation element.

* * * * *

UNITED STATES PATENT AND TRADEMARK OFFICE
CERTIFICATE OF CORRECTION

PATENT NO. : 10,831,036 B2
APPLICATION NO. : 14/987762
DATED : November 10, 2020
INVENTOR(S) : Forster Shih and Yee-Chung Fu Page 1 of 1

It is certified that error appears in the above-identified patent and that said Letters Patent is hereby corrected as shown below:

On the Title Page

Column 2, "(74) Attorney, Agent or Firm - Chen-Chi Li" should be replaced with --(74) Attorney, Agent or Firm - Chen-Chi Lin--.

Signed and Sealed this
Twenty-second Day of December, 2020

Andrei Iancu
*Director of the United States Patent and Trademark Office*